June 28, 1932.  J. FOLK  1,865,243

POWER DRIVE FOR SLICING MACHINES

Filed Feb. 10, 1926  2 Sheets-Sheet 1

Inventor
Joseph Folk
By Nissen & Crane Attys

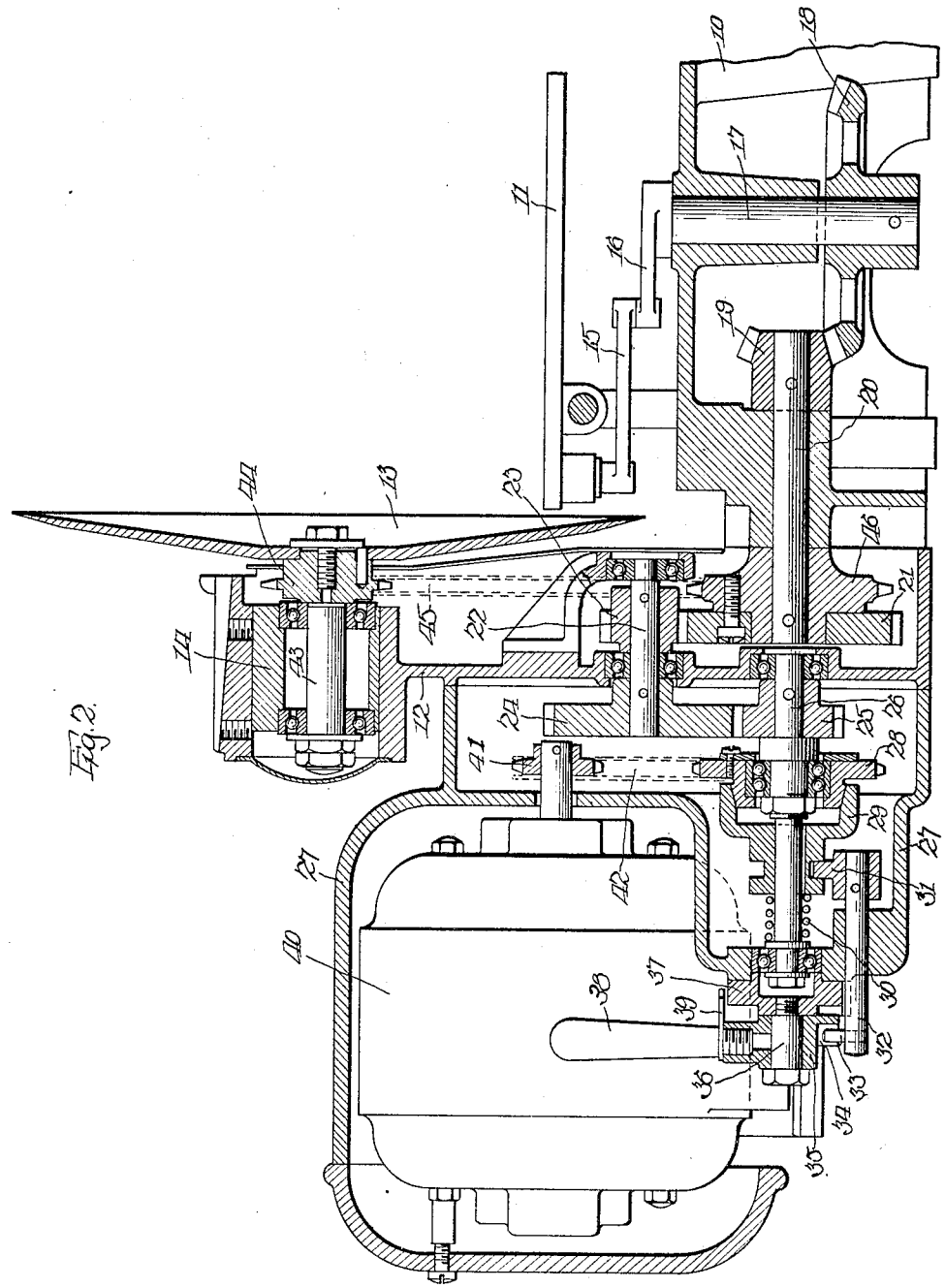

Patented June 28, 1932

1,865,243

UNITED STATES PATENT OFFICE

JOSEPH FOLK, OF LA PORTE, INDIANA, ASSIGNOR TO U. S. SLICING MACHINE COMPANY, OF LA PORTE, INDIANA, A CORPORATION OF INDIANA

POWER DRIVE FOR SLICING MACHINES

Application filed February 10, 1926. Serial No. 87,207.

This invention relates to a motor drive for a machine for slicing meat or other commodities and has for its object the provision of power operated driving mechanism for such machine which shall be simple and compact in arrangement and improved in construction and operation.

The invention is exemplified in the combination and arrangement of parts shown in the accompanying drawings and described in the following specification, and it is more particularly pointed out in the appended claims.

In the drawings—

Figure 2 is a section substantially on line 2—2 of Figure 1.

Figure 1:
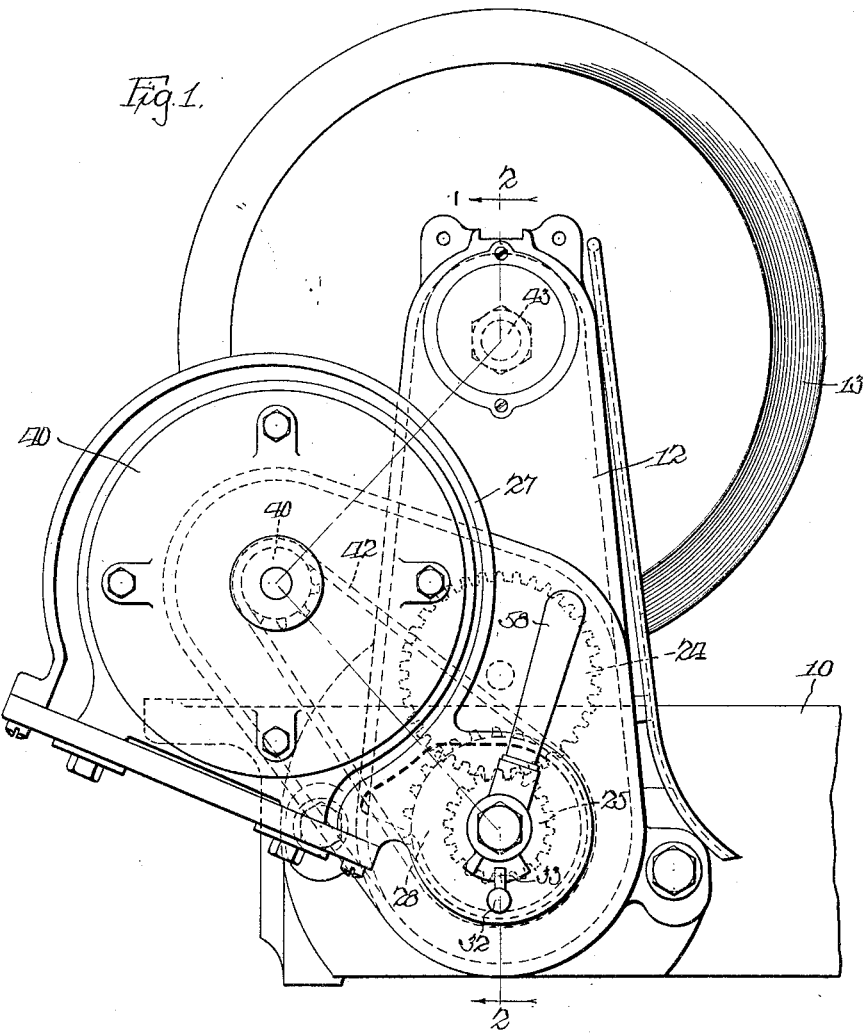
Figure 1 is a front elevation of a portion of a slicing machine showing one embodiment of the present invention applied thereto.

The numeral 10 designates the frame of a slicing machine having a reciprocating table 11 mounted thereon and a pedestal 12 having a knife 13 journalled in the bearing 14 therein. The table 11 is reciprocated by a connecting rod 15 and a crank 16, the crank being supported by a shaft 17 provided with a gear 18. The gear 18 meshes with a pinion 19 secured to a shaft 20 and a gear 21 is connected to the opposite end of the shaft from the pinion 19. A stud shaft 22 is journalled in the pedestal 12 and is provided with a pinion 23 meshing with the gear 21 and with a gear 24 meshing with a pinion 25 secured to a shaft 26. The shaft 26 is journalled in a housing 27 secured to the front face of the pedestal 12. A sprocket wheel 28 is journalled to rotate on the shaft 26 but may be secured thereto by a clutch 29 splined on the shaft 26. A spring 30 normally holds the clutch 29 in driving engagement with the sprocket wheel 28. An operating yoke 31 engages the clutch 29 and is secured to a rod 32 having a pin 33 thereon engaging a cam face 34 carried by a sleeve 35 which is journalled on a stud 36. The stud 36 is supported by a cap 37 mounted on the housing 27. A handle 38 is provided for rotating the sleeve 35 to move the clutch 29 through the operation of the cam face 34 and the rod 32. A pointer 39 is provided for indicating the position of the clutch 29. A motor 40 is mounted in the housing 27 and is provided with a sprocket wheel 41 connected by a chain 42 with the sprocket 28. The sprocket wheel and gearing interposed between the motor shaft and the drive shaft 20 constitute speed reduction mechanism by means of which the shaft 20 is driven from the motor, the clutch 29 being interposed between the motor and the shaft. The spindle 43, on which the knife 13 is mounted, is provided with a sprocket 44 connected by a chain 45 with a sprocket 46 secured to the shaft 20. By means of the arrangement shown, a main drive shaft 20 is provided which is driven through reduction speed gearing by the motor, and the knife 13 and the reciprocating table 11 are driven by separate connections from the drive shaft 20. The speed ratios between the drive shaft 20 and the two driven parts 11 and 13 are independent of each other and the reduction gearing between the motor and drive shaft 20 is proportioned to give a suitable speed to the shaft 20 so that the driven parts may be connected by a single set of driving mechanism to impart to them their proper speeds. A slight reduction from the shaft 20 is desirable for the drive shaft 17 which operates the reciprocating table 11 while the spindle 43 will be driven at a somewhat increased speed over the shaft 20.

I claim:—

1. A slicing machine comprising a frame having a reciprocating table thereon, a drive shaft for said table extending transversely to the direction of reciprocation of said table, a knife support, a rotary slicing knife journalled in said support and disposed adjacent the path of reciprocation of said table, means for operatively connecting said drive shaft with said slicing knife, a motor disposed adjacent said knife support, reduction gearing for transmitting motion from said motor to said drive shaft, a clutch for making and breaking connection between said motor and drive shaft, and an operating handle for said clutch.

2. Driving mechanism comprising a motor having a drive shaft, a second shaft disposed parallel with said motor shaft, means for connecting said second shaft with said motor shaft, a clutch for making and breaking connection between said second shaft and said motor shaft, a jack shaft parallel with said second shaft, reduction gearing for operating said jack shaft from said second shaft, a third shaft co-axial with said second shaft, reduction gearing for driving said third shaft from said jack shaft, a spindle parallel with said jack shaft, means for driving said spindle from said third shaft, a reciprocating member, a crank shaft for driving said reciprocating member, and means for driving said crank shaft from said third shaft.

3. In a slicing machine, the combination with a rotatable knife, of a table movable bodily relative to said knife, a drive shaft, operative driving connections between said drive shaft and said knife, operative driving connection between said drive shaft and table, and means for selectively actuating said drive comprising a power operated shaft, reduction gearing arranged between said power operated shaft and said drive shaft, and an operative connection between said reduction gearing and said drive shaft comprising a clutch having two portions, one of which is directly secured to the drive shaft and the other of which is directly secured to said reduction gearing so that when said portions are moved away from each other to disengage said clutch, the drive shaft is entirely free of said reduction gearing and said table and knife may be manually operated independently of said power driven shaft and said reduction gearing.

In testimony whereof I have signed my name to this specification on this sixth day of February, A. D. 1926.

JOSEPH FOLK.